US011034004B2

(12) United States Patent
Chen

(10) Patent No.: US 11,034,004 B2
(45) Date of Patent: Jun. 15, 2021

(54) FASTENER PUSHING MECHANISM

(71) Applicant: CENTRIFUGE INDUSTRIAL CO., LTD., Taichung (TW)

(72) Inventor: Jang-Bao Chen, Taichung (TW)

(73) Assignee: CENTRIFUGE INDUSTRIAL CO., LTD., Taichung (TW)

( * ) Notice: Subject to any disclaimer, the term of this patent is extended or adjusted under 35 U.S.C. 154(b) by 278 days.

(21) Appl. No.: 16/374,419

(22) Filed: Apr. 3, 2019

(65) Prior Publication Data

US 2019/0344412 A1 Nov. 14, 2019

(30) Foreign Application Priority Data

May 8, 2018 (TW) .................................. 107115637

(51) Int. Cl.
*B25B 1/00* (2006.01)
*B25B 27/02* (2006.01)
*B60B 29/00* (2006.01)

(52) U.S. Cl.
CPC ............ *B25B 27/023* (2013.01); *B60B 29/00* (2013.01)

(58) Field of Classification Search
CPC ..... B25B 27/00; B25B 27/023; B25B 27/146; B25B 31/00; B60B 29/00; B60B 31/00
See application file for complete search history.

(56) References Cited

U.S. PATENT DOCUMENTS

| 9,751,199 | B2* | 9/2017 | Andrews | ................ B25B 27/04 |
| 2015/0224635 | A1* | 8/2015 | Andrews | ............... B25B 27/023 |
| | | | | 29/426.5 |
| 2019/0344412 | A1* | 11/2019 | Chen | .................... B25B 27/023 |

* cited by examiner

*Primary Examiner* — Lee D Wilson
(74) *Attorney, Agent, or Firm* — Muncy, Geissler, Olds & Lowe, P.C.

(57) ABSTRACT

A fastener pushing mechanism is provided for an object. The object includes a base, at least one fastener and at least one insertion hole disposed through the base. The fastener is detachably inserted into the insertion hole and positioned on the base. The fastener pushing mechanism includes a main body assembly and a driving assembly. The main body assembly includes a connecting portion and a driving portion and a seat which are disposed at two opposite ends of the connecting portion. The seat includes a hole for receiving the fastener. The driving assembly is attached to the driving portion and movable along the movement path. One of the main body assembly and the driving assembly is abutted against the base and the other is abutted against the fastener. As the driving assembly is driven, the driving assembly drives the fastener to move relative to the base.

9 Claims, 10 Drawing Sheets

FASTENER PUSHING MECHANISM

BACKGROUND OF THE INVENTION

Field of the Invention

The present invention relates to a fastener pushing mechanism.

Description of the Prior Art

In mechanical structures, fasteners are usually used to positionally assemble one component with another component, for example but not limited to wheel bolts of a wheel hub which are used to connect a wheel with the wheel hub. The wheel bolts may be adhered to the wheel hub because of rustiness or other reasons after a long-term using, which causes that the wheel bolts are difficult to be detached from the wheel hub and inconvenience for maintenance.

To resolve the problem described above, a maintenance staff usually knocks the wheel bolts adhered to the wheel hub by a hammer or other objects so as to depart the wheel bolts from a surface of the wheel hub. However, the wheel bolts are easy to be broken after being knocked, and structure of the wheel hub may also be damaged.

The present invention is, therefore, arisen to obviate or at least mitigate the above-mentioned disadvantages.

SUMMARY OF THE INVENTION

The main object of the present invention is to provide a fastener pushing mechanism which can stably assemble a fastener to an object or rapidly disassemble the fastener from the object without damaging the object and the fastener, and the fastener pushing mechanism has a simple structure and is easy to operate.

To achieve the above and other objects, the present invention provides a fastener pushing mechanism for an object. The object includes a base, at least one fastener and at least one insertion hole disposed through the base. The fastener is detachably inserted into the insertion hole and positioned on the base. The fastener pushing mechanism includes a main body assembly and a driving assembly. The main body assembly includes a connecting portion and a driving portion and a seat which are disposed at two opposite ends of the connecting portion. The driving portion and the seat are configured to be disposed at two opposite sides of the base, and the seat includes a hole for receiving the fastener. A phantom straight line on which the driving portion and the hole are located is defined as a movement path, and the movement path is configured to extend through the insertion hole and the fastener, and the seat annularly surrounds the hole around the movement path. The driving assembly is attached to the driving portion and movable along the movement path. Wherein one of the main body assembly and the driving assembly is abutted against the base, the other of the main body assembly and the driving assembly is abutted against the fastener, as the driving assembly is driven, the driving assembly drives the fastener to move relative to the base along the movement path; wherein as view in the movement path, the seat further includes two wing portions configured to abut against the base and an arcuate portion, the two wing portions are symmetrically disposed relative to the hole and extend away from the hole, the two wing portions are connected to opposite ends of the arcuate portion, and the arcuate portion is concave toward the hole.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
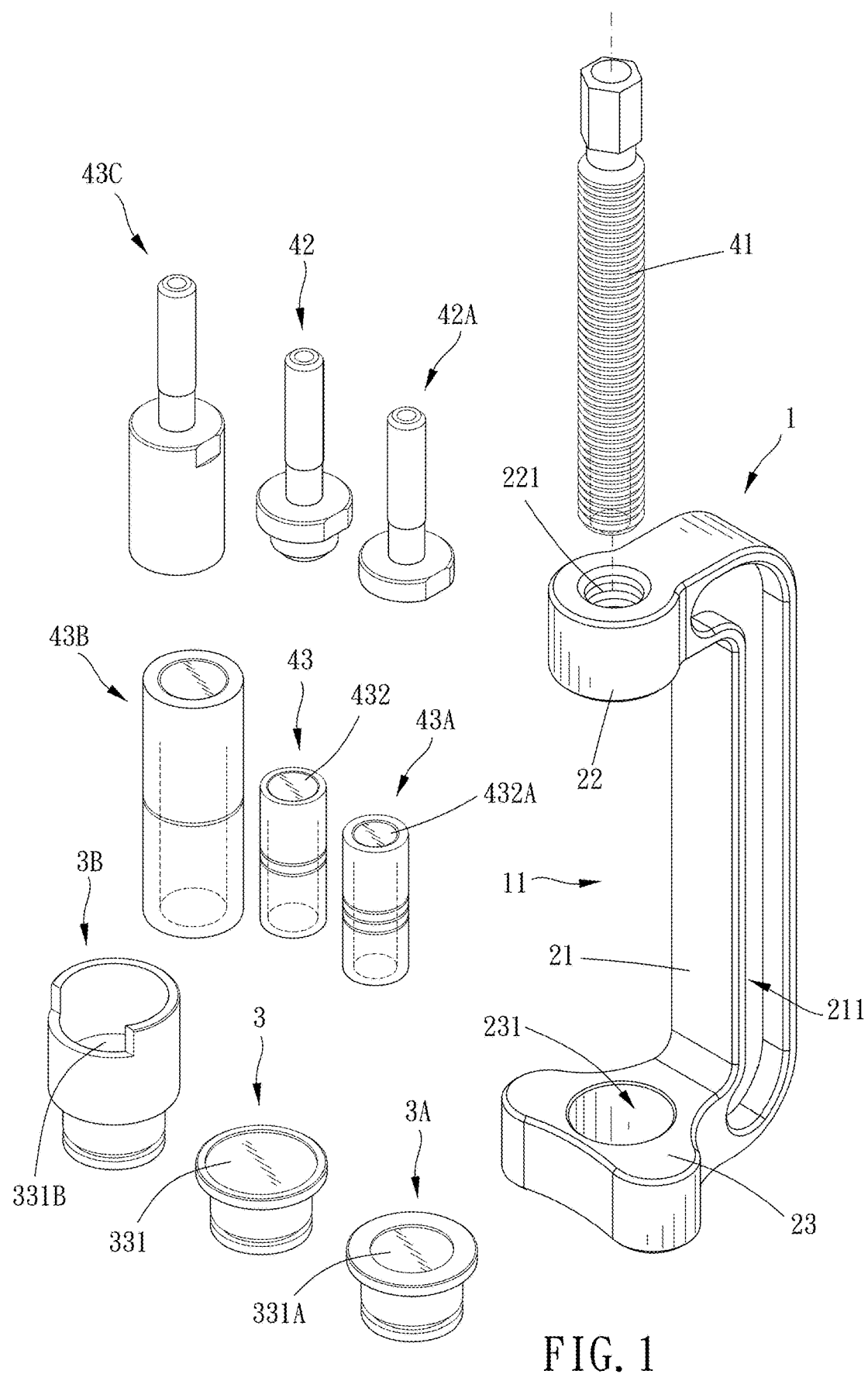
FIG. 1 is a breakdown drawing of a preferable embodiment of the present invention.
Figure 2:
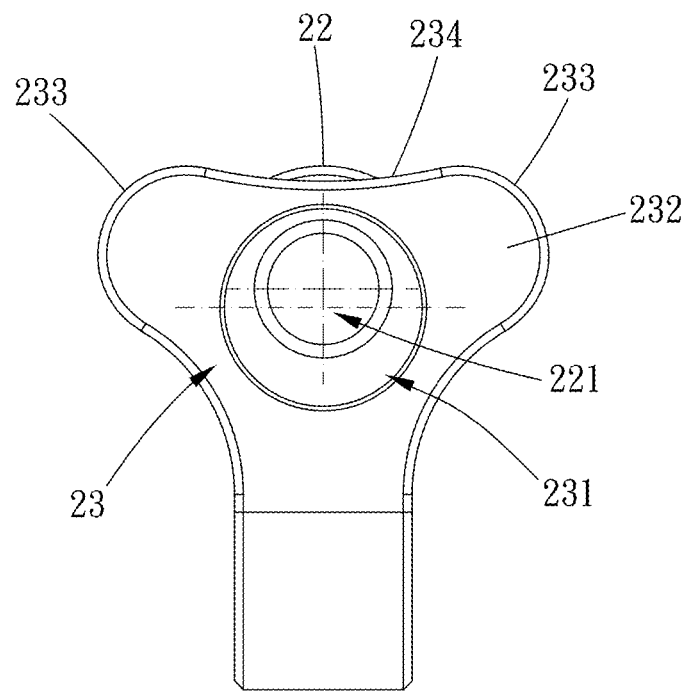
FIG. 2 is a bottom view of a main body assembly of FIG. 1.
Figure 3:
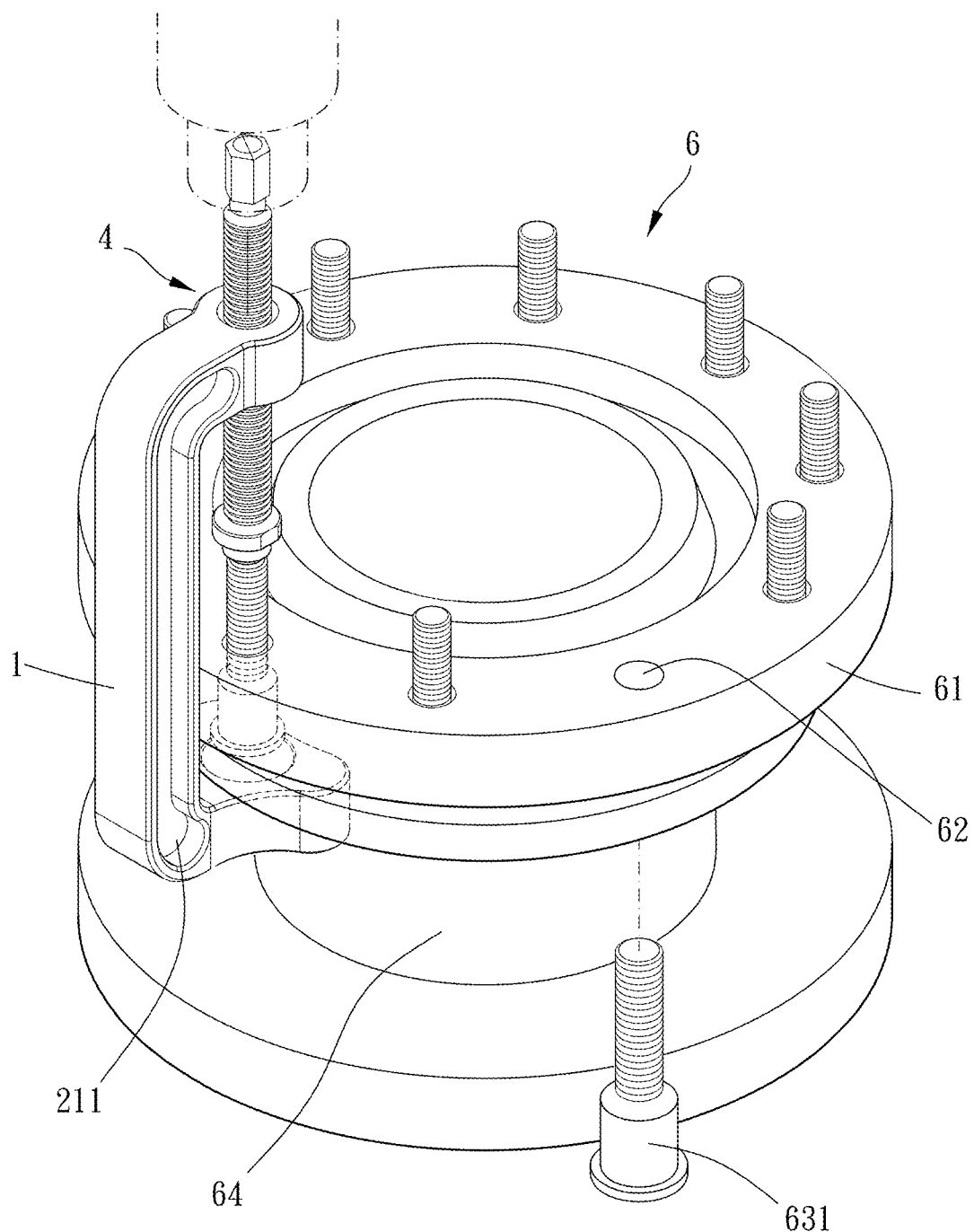
FIG. 3 is a schematic diagram of a preferable embodiment of the present invention used to disassemble a fastener.

Please refer to FIGS. 1 to 9 for a preferable embodiment of the present invention. A fastener pushing mechanism of the present invention is configured for an object 6. The object 6 includes a base 61, at least one fastener 63 and at least one insertion hole 62 disposed through the base 61. The fastener 63 is detachably inserted into the insertion hole 62 and positioned on the base 61. For example but not limited to this embodiment, the object 6 is a wheel hub, the fastener 63 is a wheel bolt, and the wheel bolt and an inner wall of the insertion hole 62 are in a tight-fit engagement.

The fastener pushing mechanism includes a main body assembly 1 and a driving assembly 4. The main body assembly 1 includes a connecting portion 21 and a driving portion 22 and a seat 23 which are disposed at two opposite ends of the connecting portion 21. The driving portion 22 and the seat 23 are configured to be disposed at two opposite sides of the base 61. The seat 23 includes a hole 231 for receiving the fastener 63. A phantom straight line on which the driving portion 22 and the hole 231 are located is defined as a movement path 5, and the movement path 5 is configured to extend through the insertion hole 62 and the fastener 63. The driving assembly 4 is attached to the driving portion 22 and movable along the movement path 5. One of the main body assembly 1 and the driving assembly 4 is abutted against the base 61, and the other of the main body assembly 1 and the driving assembly 4 is abutted against the fastener 63. As the driving assembly 4 is driven, the driving assembly 4 drives the fastener 63 to move relative to the base 61 along the movement path 5.

Specifically, the driving portion 22, the connecting portion 21 and the seat 23 define a mouth portion 11 which is configured for part of the base 61 to protrude therewithin. The driving portion 22, the connecting portion 21 and the seat 23 form a U shape as viewed from a direction perpendicular to the movement path 5. A thickness of the driving portion 22 is equal to a thickness of the seat 23 in the movement path 5 so that two ends of the connecting portion 21 are the same in weight and good in balance. A ratio of a distance between the driving portion 22 and the seat 23 to the thickness of the driving portion 22 is between 5 and 6 so that the mouth portion 11 is large enough to receive respective bases of various thicknesses and the driving portion 22 has sufficient structural strength.

Two opposite sides of the connecting portion 21 respectively have a recession 211 which is configured for operator's fingers to protrude therewithin for easy gripping, and the connecting portion 21 is light-weight. As viewed in the movement path 5, at least part of a cross-sectional shape of the connecting portion 21 is T-shaped. In this embodiment, the cross-sectional shape of the connecting portion 21 is H-shaped so that the connecting portion 21 has sufficient stiffness and bending resistance.

The driving portion 22 is configured to face a first side 611 of the base 61, and the seat 23 is configured to face a second side 612 of the base 61. When the driving assembly 4 is abutted against the fastener 63, the seat 23 is abutted against the second side 612 and the hole 231 corresponds to the fastener 63, the driving assembly 4 is driven to drive the fastener 63 to move in a direction from the first side 611 toward the second side 612 so that the fastener 63 is movable through the hole 231 to detach from the base 61.

A movement direction of the driving assembly 4 (the movement path 5) is the same as a assembling direction of the fastener 63 so that the fastener 63 is stably pushed along an opening direction of the insertion hole 62 without pressing, rubbing against or colliding with an inner wall of the insertion hole 62 and the fastener 63.

Figure 4:
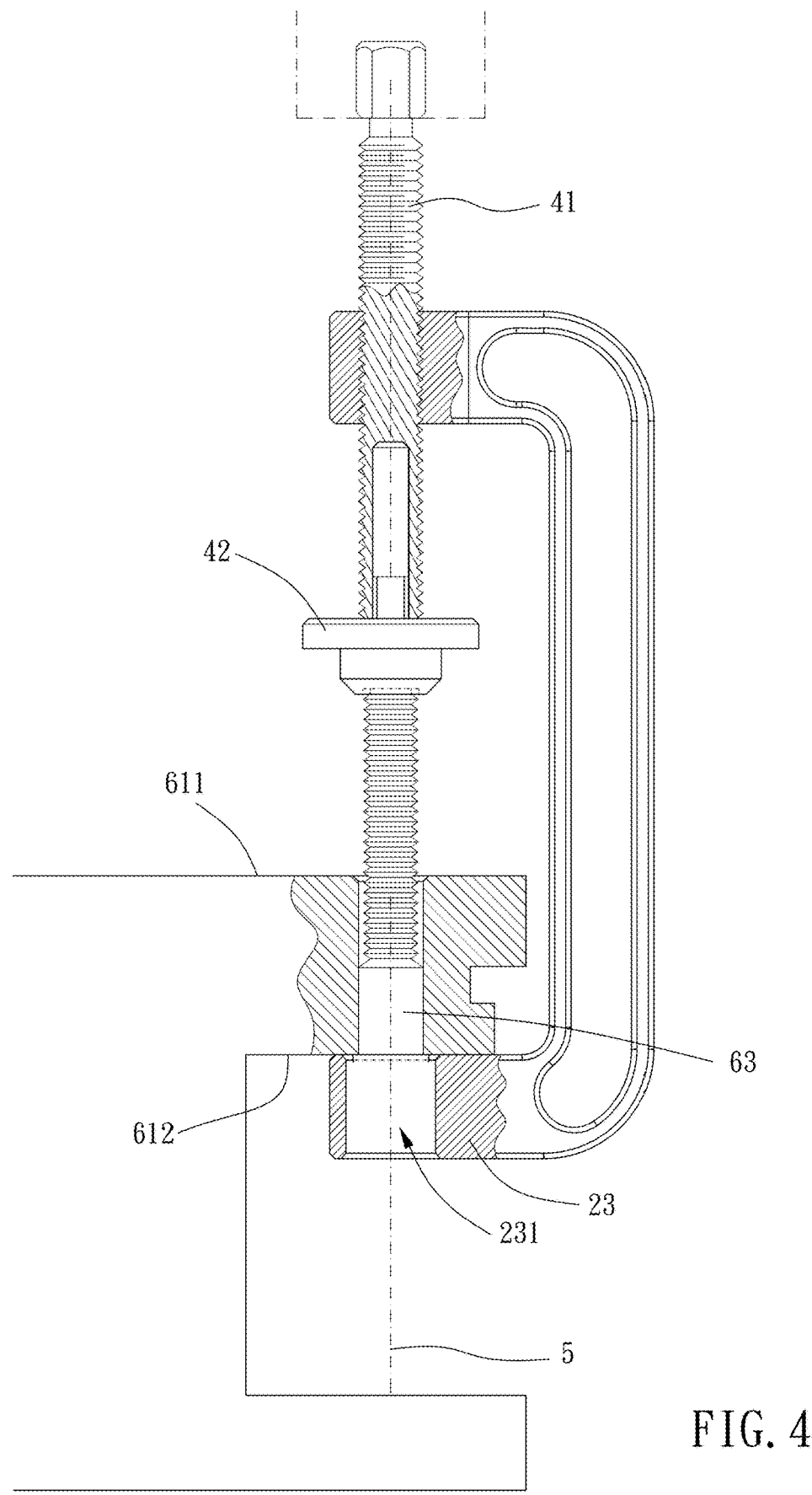
FIGS. 4 and 5 are operational schematic diagrams of FIG. 3.
Figure 5:
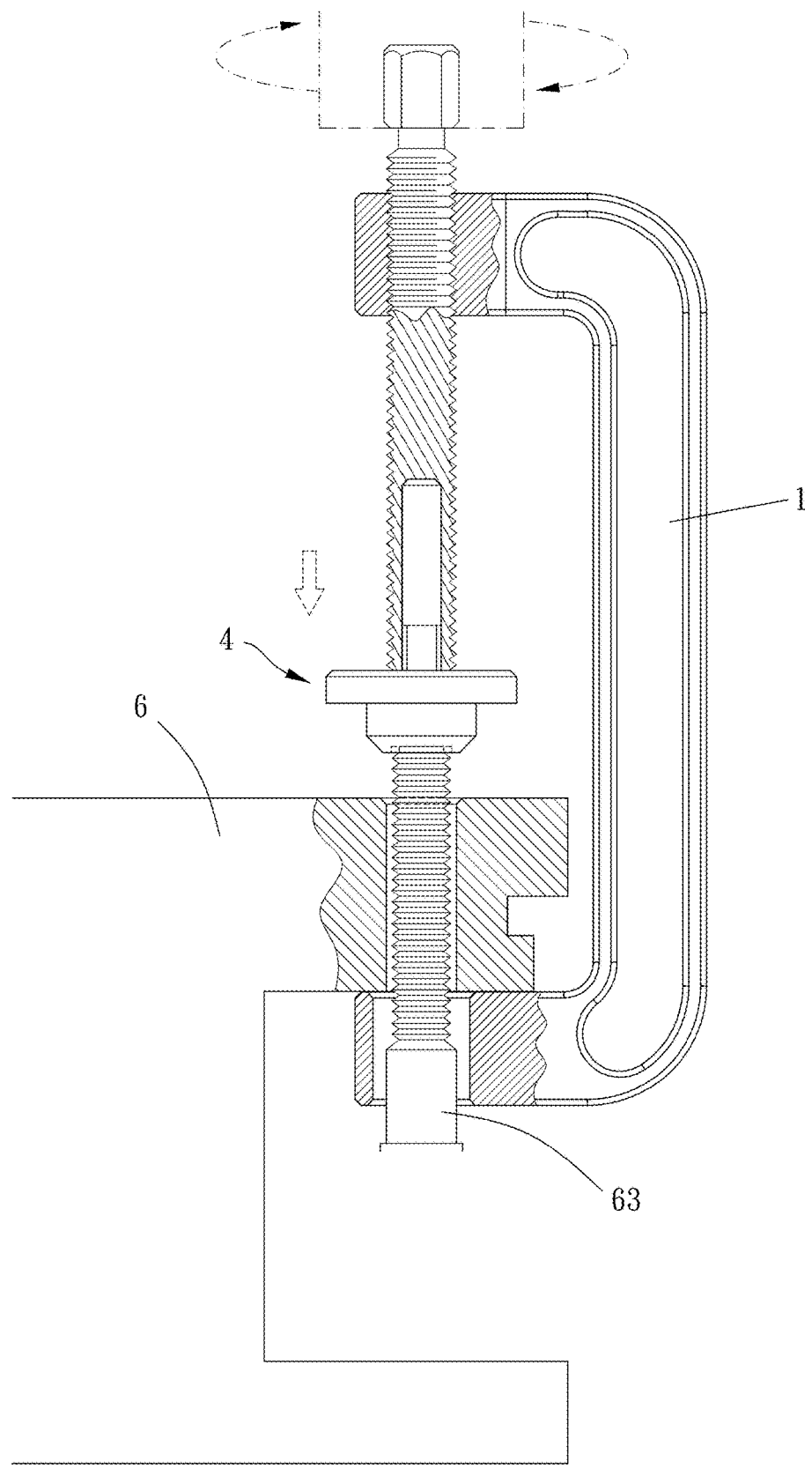
Figure 6:
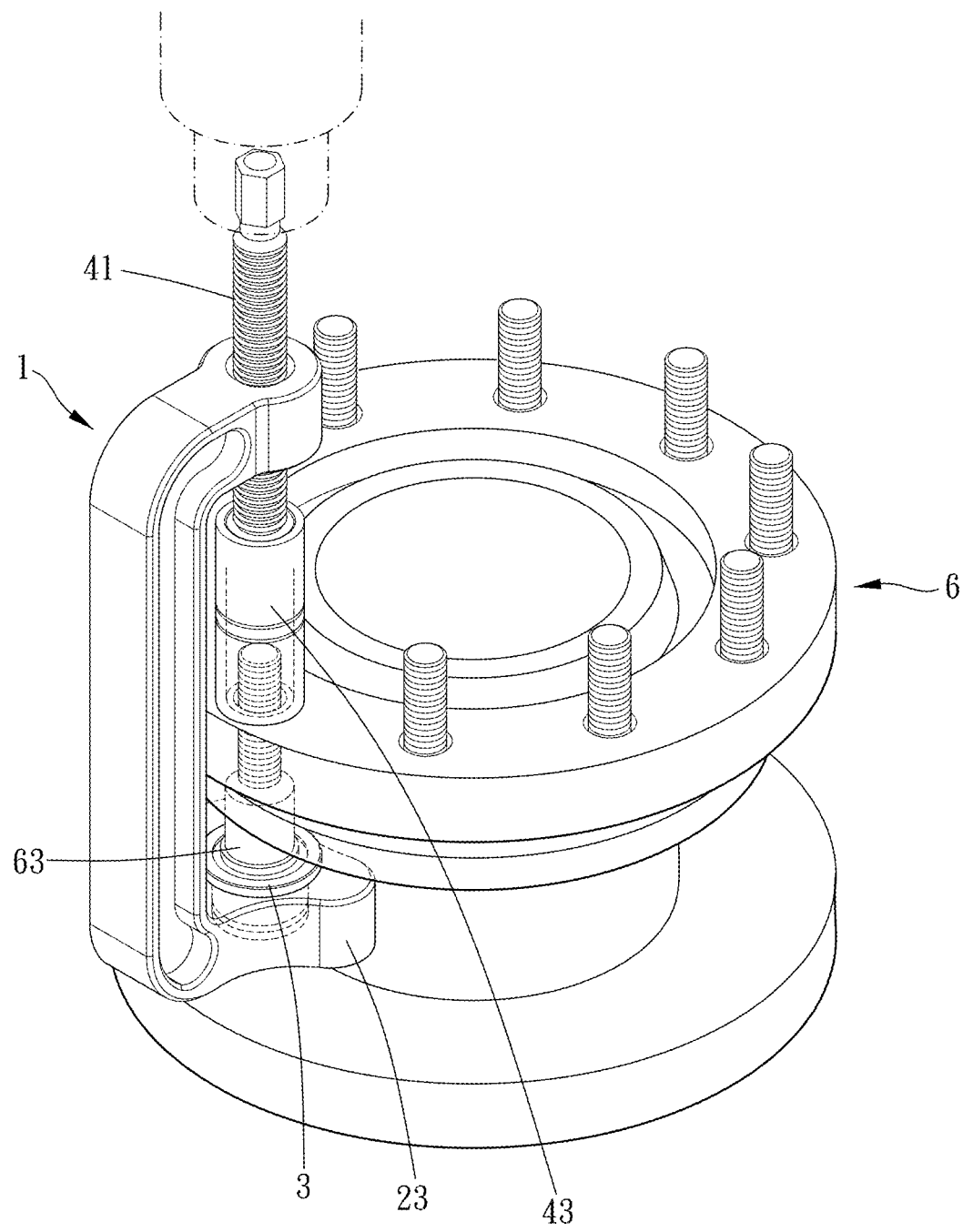
FIG. 6 is a schematic diagram of a preferable embodiment of the present invention used to assemble a fastener.
Figure 7:
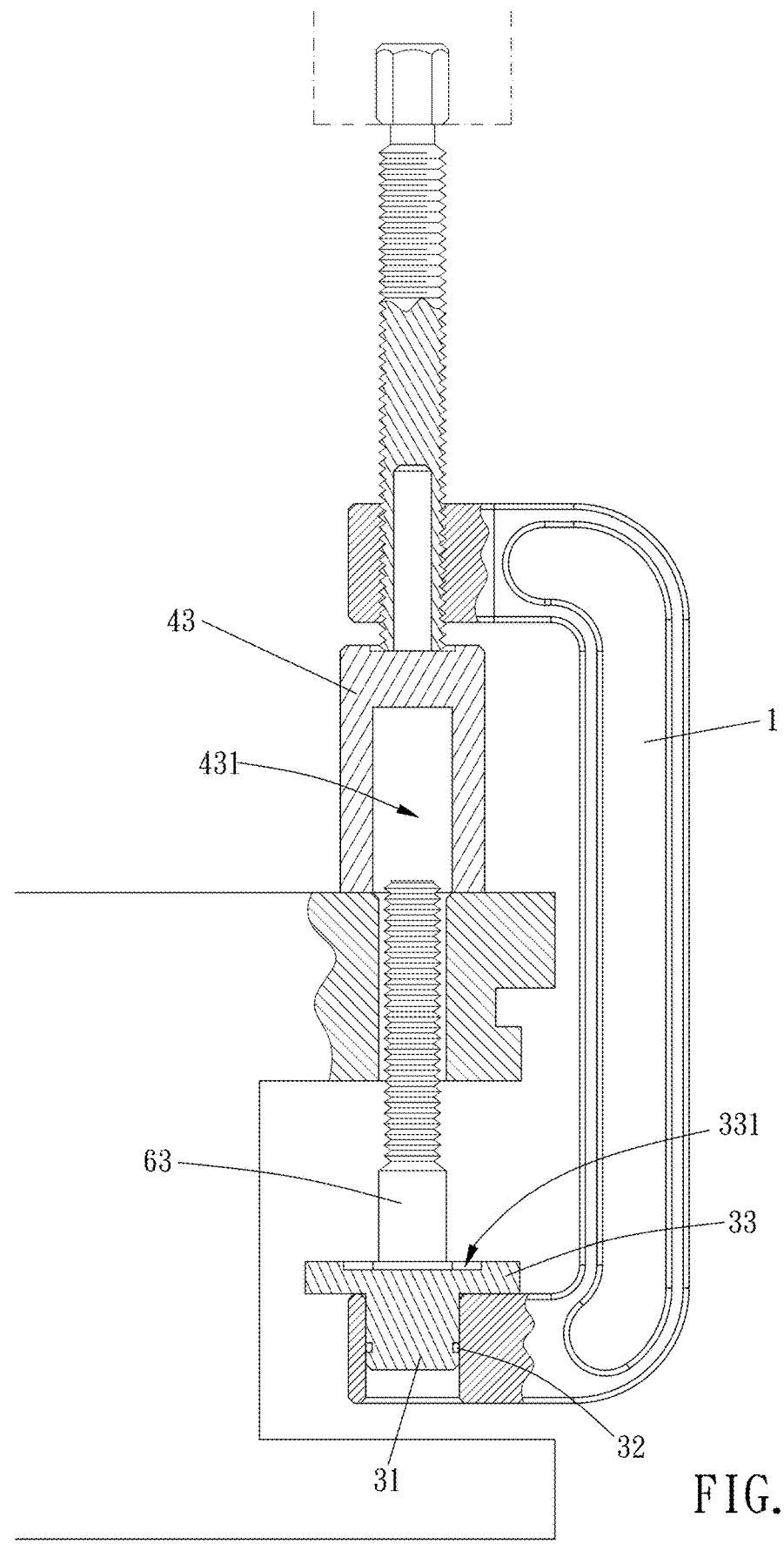
FIGS. 7 and 8 are operational schematic diagrams of FIG. 6.
Figure 8:
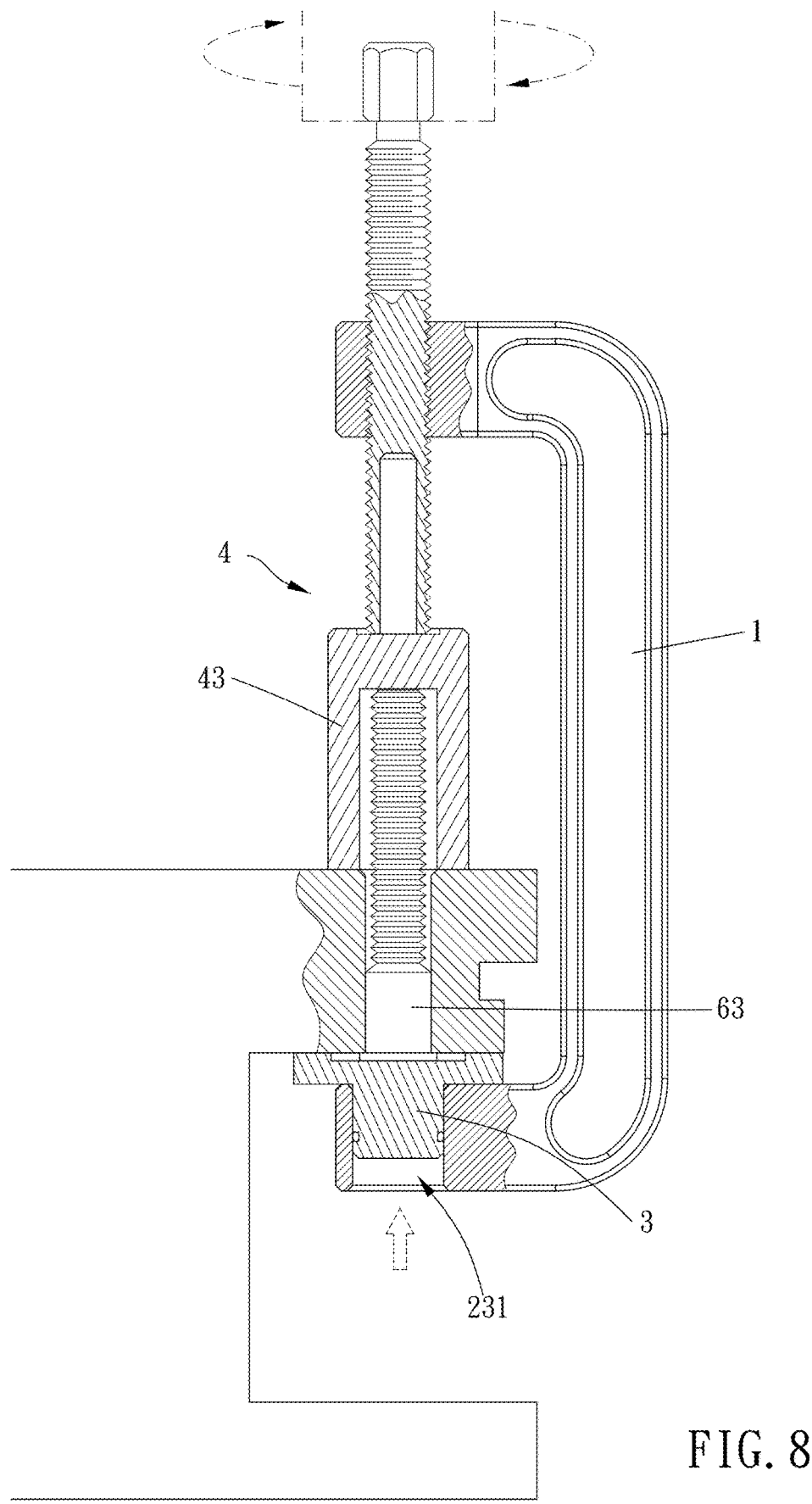

Specifically, the driving assembly 4 includes a bolt 41 and a push member 42. The bolt 41 is movably screwed to the driving portion 22. One end of the bolt 41 is configured to be connected with a driving tool (such as wrench, pneumatic or electrical tool), and the push member 42 is preferably detachably assembled with another end of the bolt 41 so that the push member 42 is replaceable. Moreover, the push member 42 may have a different structure according to any various requirements. For example, when a cross section of one end of the fastener 63 is small, the push member 42 as shown in FIGS. 1 and 4 is chosen to use; when the cross section of one end of the fastener is large, the push member 42A as shown in FIG. 1 is chosen to use so as to increase a contact area.

The driving portion 22 has a threaded hole 221, and the bolt 41 is movably screwed to the threaded hole 221. By screwing, the bolt 41 is stably movable so as to provide stable pushing force to the fastener 63. An aperture of the threaded hole 221 is smaller than an aperture of the hole 231 so that a head portion 631 of the fastener 63 with large size can penetrate through the hole 231. Moreover, as viewed in the movement path 5, the threaded hole 221 is eccentric relative to the hole 231 and a center of the threaded hole 221 is higher than a center of the hole 231 based on the connecting portion 21.

The seat 23 further includes two wing portions 232 configured to abut against the base 61 and an arcuate portion 234. The two wing portions 232 are symmetrically disposed relative to the hole 231 and extend away from the hole 231 so as to increase a contact area with the second side 612 and stably abut against the base 61.

Figure 10:
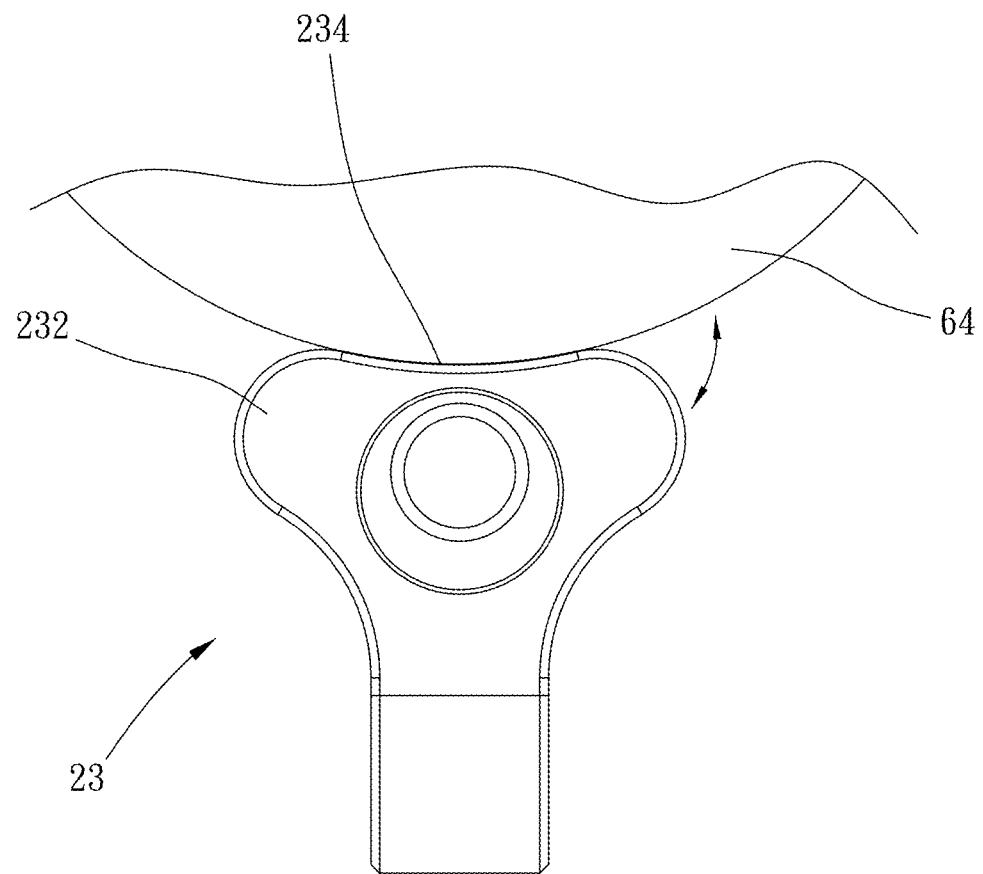
FIG. 10 is a partial bottom view of a preferable embodiment of the present invention in operation.

Moreover, the two wing portions 232 are connected to opposite ends of the arcuate portion 234, and the arcuate portion 234 is concave toward the hole 231. As shown in FIG. 10, the seat 23 has a space configured for a main body 64 of the object 6 to partially protruding therewithin so that the main body 64 is in surface contact with the arcuate portion 234, which provides supporting force to the seat 23 during operation. The main body 64 is connected laterally to the base 61. Furthermore, during shaking, the two wing portions 232 are laterally abuttable against the main body 64, which restricts the seat 23 to be movable in a small range so that the seat 23 can rapidly restore to abut against the main body 64. Therefore, the two wing portions 232 and the arcuate portion 234 are conducive to operational stability.

Preferably, respective one of the two wing portions 232 has an arcuate section 233, and the arcuate portion 234 is connected between two of said arcuate sections 233 so that the seat 23 is Y-shaped. The arcuate sections 233 of the two wing portions 232 and the arcuate portion 234 have smooth outer contours so that they are smoothly movable relative to other objects. Furthermore, the driving portion 22 is cylindrical, and part of the driving portion 22 protrudes beyond the arcuate portion 234 as view in the movement path 5. When the main body assembly 1 is supported upright by the two wing portions 232, its center of gravity is biased to the two wing portions 232 so that the main body assembly 1 can stand stably.

The fastener pushing mechanism can be operated to disassemble the fastener 63 from the object 6 as described above, and it also can be cooperate with other components to stably assemble the fastener 63 into the object 6.

Specifically, the main body assembly 1 further includes an abutting member 3. The abutting member 3 is detachably positioned on the seat 23, and the abutting member 3 at least partially covers the hole 231 and is configured for interference with the fastener 63 on the movement path 5. The driving assembly 4 includes a receiving member 43 configured to cover the insertion hole 62, and the receiving member 43 includes an internal space 431.

When the receiving member 43 is abutted against the first side 611 of the base 61, the bolt 41 is connected with the receiving member 43 and the abutting member 3 is abutted against the fastener 63, the bolt 41 is driven and the driving portion 22, the connecting portion 21 and the seat 3 are moved relative to the base 61 to drive the abutting member 3 to move the fastener 63 in a direction from the second side 612 toward the first side 611 so that part of the fastener 63 penetrates through the insertion hole 62 and extends into the internal space 431 and the fastener 63 is inserted within the object 6, which is convenient and rapid.

Figure 9:
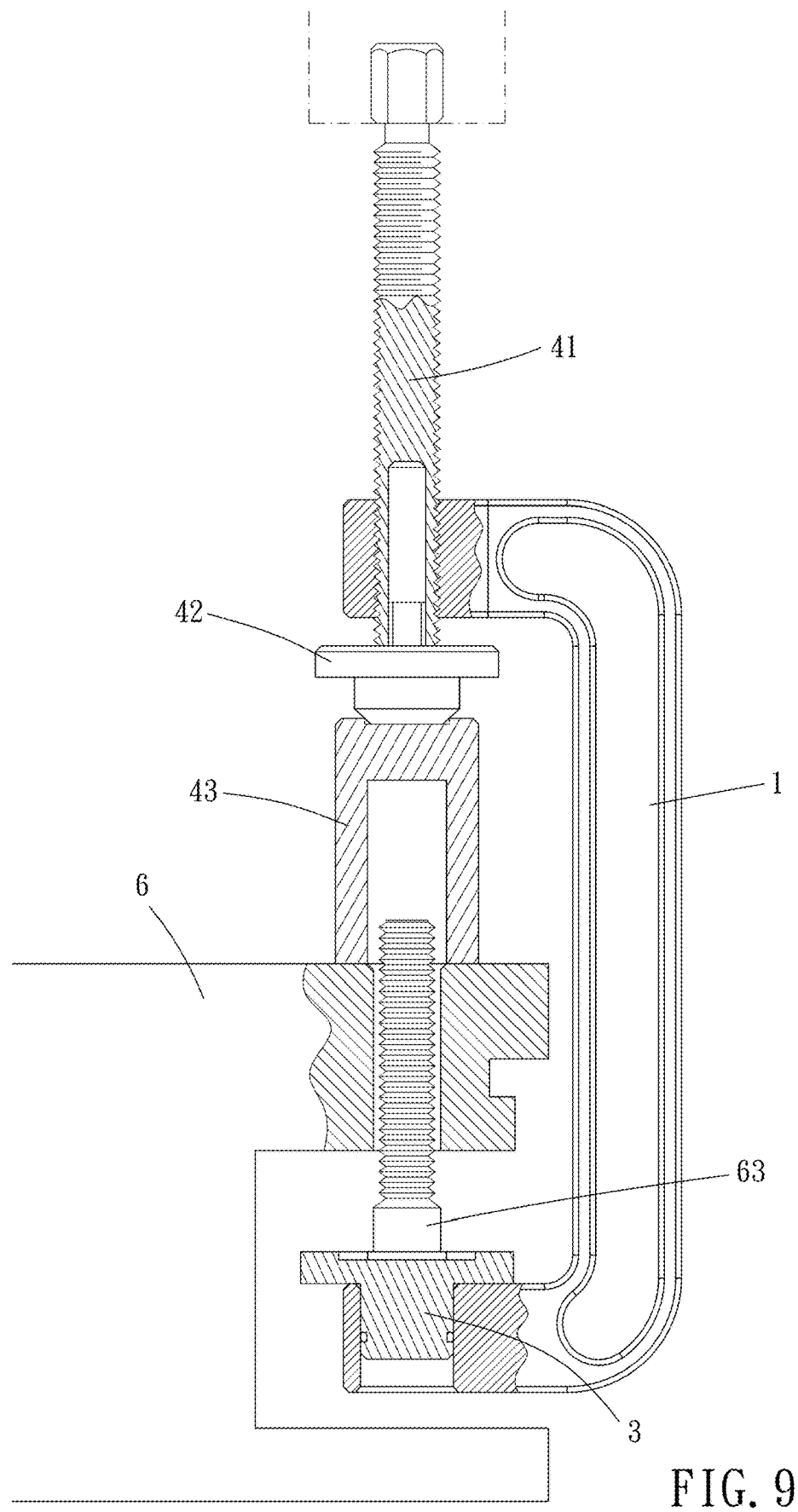
FIG. 9 is another schematic diagram of a preferable embodiment of the present invention used to assemble a fastener.

One end of the receiving member 43 is abutted against the first side 611 of the base 61, and another end of the receiving member 43 is abutted against the bolt 41. Preferably, the end of the receiving member 43 abutted against the bolt 41 further includes a groove 432, and the groove 432 is configured to receive part of the bolt 41, which enhances connection between the receiving member 43 and the bolt 41 and avoids relative displacement between the receiving member 43 and the bolt 41. As shown in FIG. 9, the fastener pushing mechanism may cooperate with the push member 42, and the push member 42 is abutted against one end of the receiving member 43.

The receiving member 43 may have a different structure according to any various requirements. For example, when a cross section of the bolt is smaller, the receiving member 43A with the groove 432A which has smaller cross section is chosen to use; when a length of the fastener protruding beyond the first side 611 is longer, the receiving member 43B with a longer length as shown in FIG. 1 is chosen to use. Furthermore, the receiving member 43C may have a structure as shown in FIG. 1, the receiving member 43C is detachably assembled to the bolt 41 so as to avoid relative displacement.

In this embodiment, the abutting member 3 includes a plug portion 31 and a blocking portion 33, the blocking portion 33 is connected laterally to the plug portion 31 so that the abutting member 3 is T-shaped. The plug portion 31 is configured to be inserted into the hole 231, and the blocking portion 33 is configured to abut against the fastener 63. A diametric dimension of the plug portion 31 is smaller than a diametric dimension of the blocking portion 33 on the movement path 5 so as to enhance connection stability between the abutting member 3 and the seat 23. The abutting member 3 is detachably inserted within the seat 23, which is convenient to switch between assembling and disassembling operations.

Preferably, the blocking portion 33 further includes a receiving room 331, and the receiving room 331 is configured to receive part of the fastener 63 (the head portion 631), which prevents the fastener 63 from displacement relative to the blocking portion 33.

The abutting member 3 is replaceable according to different requirements, for example, when a cross section of the head portion of the fastener is small, the abutting member 3A with the receiving room 331A which has small cross section is chosen to use; when the head portion of the fastener is somewhat long, the abutting member 3B with the receiving room 331B which has deeper depth is chosen to use.

Preferably, an outer circumferential wall of the plug portion 31 has at least one ring member 32 disposed thereon, each of the ring member 32 is laterally abutted against and inner wall of the hole 231 so as to stably connect the abutting member 3 and the seat 23 and avoid unexpected force.

In summary, the fastener pushing mechanism can drive the fastener to stably move relative to the object, and the fastener are movable along the movement path in the pushing process, which effectively avoids frictions between the fastener and the object and maintains preferable integrity of the fastener and the object. Moreover, with the receiving member and the abutting member, the fastener is inversely movable to be assembled to the object. Therefore, the fastener pushing mechanism can be operated to assemble or disassemble the fastener and is easy to switch operation modes.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fastener pushing mechanism for an object, the object including a base, at least one fastener and at least one insertion hole disposed through the base, the fastener being detachably inserted into the insertion hole and positioned on the base, the fastener pushing mechanism including:
   a main body assembly, including a connecting portion and a driving portion and a seat which are disposed at two opposite ends of the connecting portion, the driving portion and the seat being configured to be disposed at two opposite sides of the base, the seat including a hole for receiving the fastener, a phantom straight line on which the driving portion and the hole are located is defined as a movement path, the movement path being configured to extend through the insertion hole and the fastener, the seat annularly surrounding the hole around the movement path;
   a driving assembly, attached to the driving portion and movable along the movement path;
   wherein one of the main body assembly and the driving assembly is abutted against the base, the other of the main body assembly and the driving assembly is abutted against the fastener, as the driving assembly is driven, the driving assembly drives the fastener to move relative to the base along the movement path;
   wherein as view in the movement path, the seat further includes two wing portions configured to abut against the base and an arcuate portion, the two wing portions are symmetrically disposed relative to the hole and extend away from the hole, the two wing portions are connected to opposite ends of the arcuate portion, and the arcuate portion is concave toward the hole.

2. The fastener pushing mechanism of claim 1, wherein the driving portion is configured to face a first side of the base, the seat is configured to face a second side of the base; when the driving assembly is abutted against the fastener, the seat is abutted against the second side and the hole corresponds to the fastener, the driving assembly is driven to drive the fastener to move in a direction from the first side toward the second side so that the fastener is movable through the hole to detach from the base.

3. The fastener pushing mechanism of claim 2, wherein the driving assembly includes a bolt and a push member, the bolt is movably screwed to the driving portion, one end of the bolt is configured to be connected with a driving tool, and the push member is detachably assembled with another end of the bolt.

4. The fastener pushing mechanism of claim 2, wherein the main body assembly further includes an abutting member, the abutting member is detachably positioned on the seat, the abutting member at least partially covers the hole and is configured for interference with the fastener on the movement path; the driving assembly includes a bolt and a receiving member configured to cover the insertion hole, the bolt is movably screwed to the driving portion, the receiving member includes an internal space; when the receiving member is abutted against the first side of the base, the bolt is connected with the receiving member and the abutting member is abutted against the fastener, the bolt is driven to drive the abutting member to move the fastener in a direction from the second side toward the first side so that part of the fastener penetrates through the insertion hole and extends into the internal space.

5. The fastener pushing mechanism of claim 4, wherein one end of the receiving member is abutted against the first side of the base, and another end of the receiving member is abutted against the bolt.

6. The fastener pushing mechanism of claim 4, wherein the receiving member is detachably assembled to the bolt.

7. The fastener pushing mechanism of claim 4, wherein the abutting member includes a plug portion and a blocking portion, the blocking portion is connected laterally to the plug portion, the plug portion is configured to be inserted into the hole, and the blocking portion is configured to abut against the fastener.

8. The fastener pushing mechanism of claim 7, wherein the blocking portion includes a receiving room, and the receiving room is configured to receive part of the fastener.

9. The fastener pushing mechanism of claim 5, wherein the driving assembly including a push member, one end of the bolt is configured to be connected with a driving tool, the push member is detachably assembled with another end of the bolt; the abutting member includes a plug portion and a blocking portion, the blocking portion is connected laterally to the plug portion, the plug portion is configured to be inserted into the hole, and the blocking portion is configured to abut against the fastener; the blocking portion further includes a receiving room, and the receiving room is configured to receive part of the fastener; the object is a wheel hub, the fastener is a wheel bolt, the wheel bolt and an inner wall of the insertion hole are in a tight-fit engagement; the driving portion, the connecting portion and the seat define a mouth portion which is configured for part of the base to protrude therewithin; the driving portion, the connecting portion and the seat form a U shape as viewed from a direction perpendicular to the movement path; the driving portion has a threaded hole, the bolt is movably screwed to the threaded hole, as view in the movement path, the threaded hole is eccentric relative to the hole and a center of the threaded hole is higher than a center of the hole based on the connecting portion; an aperture of the threaded hole is smaller than an aperture of the hole; respective one of the two wing portions has an arcuate section, the arcuate portion is connected between two of said arcuate sections so that the seat is Y-shaped; the driving portion is cylindrical, part of the driving portion protrudes beyond the arcuate portion as view in the movement path; the end of the receiving member abutted against the bolt further includes a groove, and the groove is configured to receive part of the bolt; an outer circumferential wall of the plug portion has at least one ring member disposed thereon, each of the ring member is laterally abutted against an inner wall of the hole; a diametric dimension of the plug portion is smaller than a diametric dimension of the blocking portion; the abutting member is T-shaped; a thickness of the driving portion is equal to a thickness of the seat on the movement path, and a ratio of a distance between the driving portion and the seat to the thickness of the driving portion is between 5 and 6; two opposite sides of the connecting portion respectively have a recession inwardly disposed thereon, as view in the movement path, at least part of a cross-sectional shape of the connecting portion is T-shaped; the cross-sectional shape of the connecting portion is H-shaped.

* * * * *